H. E. SAYER.
FARE INDICATOR AND REGISTER.
APPLICATION FILED OCT. 28, 1908.
935,273.
Patented Sept. 28, 1909.
2 SHEETS—SHEET 1.
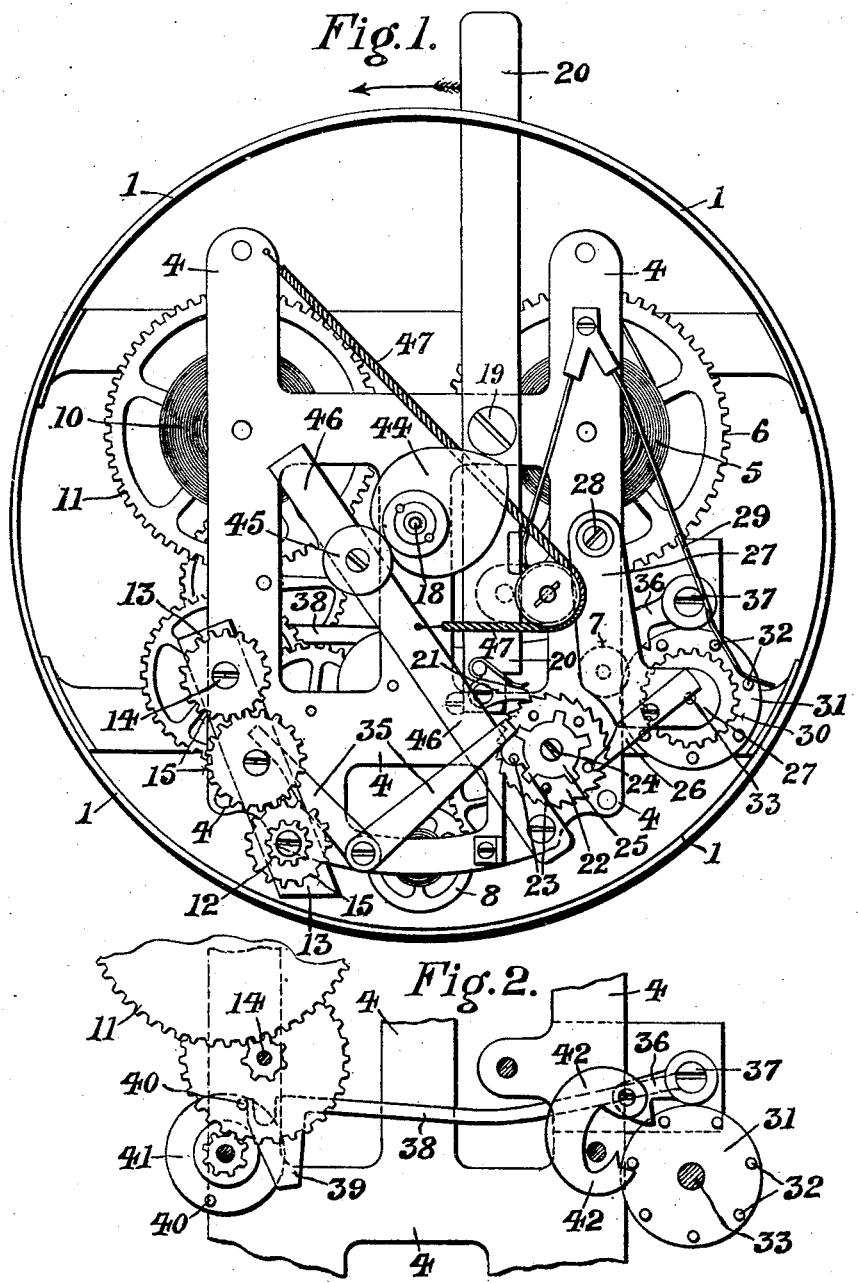
Witnesses:—
C. M. Crawford
E. Schallinger
Inventor:—
Henry Eustace Sayer
By B. Singer
Attorney H. E. SAYER.
FARE INDICATOR AND REGISTER.
APPLICATION FILED OCT. 28, 1908.
935,273.
Patented Sept. 28, 1909.
2 SHEETS—SHEET 2.
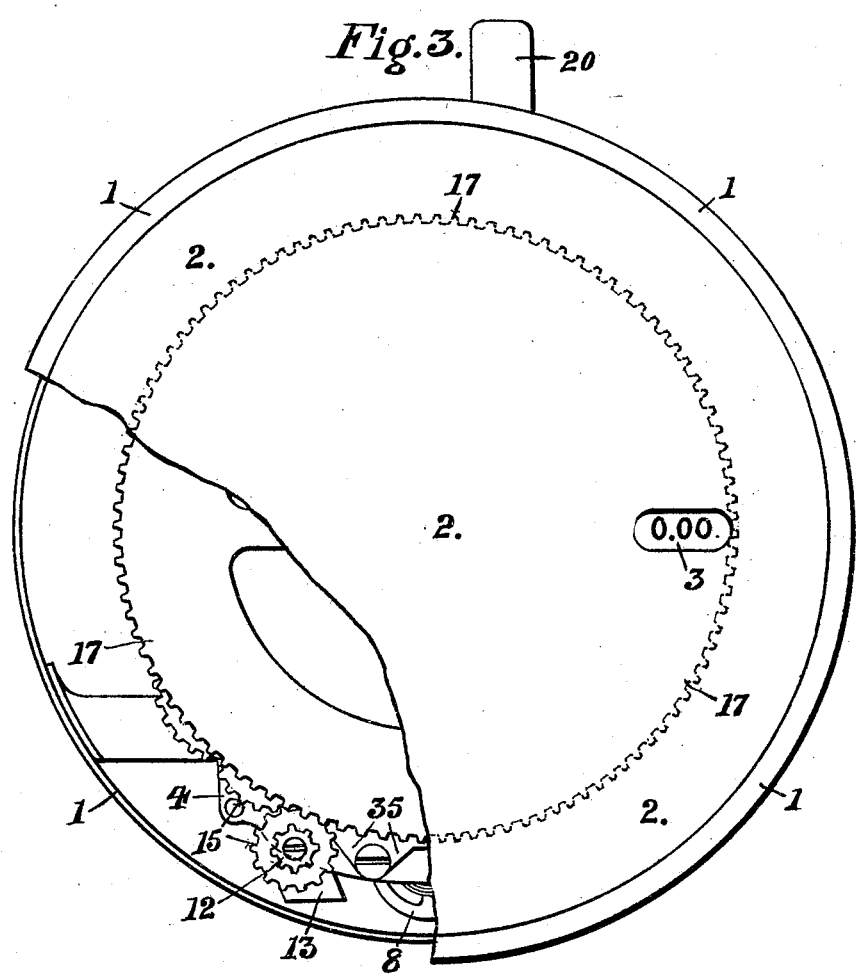
Witnesses:-
C. H. Crawford
E. Schallinger
Inventor:-
Henry Eustace Sayer
by B. Singer
Attorney

UNITED STATES PATENT OFFICE.

HENRY EUSTACE SAYER, OF BIRMINGHAM, ENGLAND.

FARE INDICATOR AND REGISTER.

935,273. Specification of Letters Patent. Patented Sept. 28, 1909.

Application filed October 28, 1908. Serial No. 459,875.

*To all whom it may concern:*

Be it known that I, HENRY EUSTACE SAYER, a subject of the King of England, residing at Birmingham, in the county of Warwick, England, have invented new and useful Improvements in Fare Indicators and Registers, of which the following is a specification.

This invention has reference to apparatus for recording or indicating the amounts of money owing or due for the employment, use, or occupation of a vehicle—that is, for registering and indicating fares—or of any apparatus, and the like.

The invention will be described in connection with or by the aid of the accompanying drawings, which illustrate an apparatus more particularly designed and adapted for use in connection with the indication of "fares", that is, for indicating the amounts due for the hire of a vehicle for the time occupied by the "fare"; and which, for convenience, may be called a "taxicronograph".

In these drawings, Figure 1 is a front elevation showing the internal mechanism of the apparatus, with the front dial and cover removed; Fig. 2 is a front sectional elevation of a part of the mechanism; and Fig. 3 is a front elevation, with the front part of the cover broken away.

In the following description of the apparatus which is described in connection with the accompanying drawings, the improvements hereunder are comprised; but with regard to the invention specifically claimed as novel, this is set out in the statement of claim comprising the several claiming clauses concluding the specification.

It may be assumed for convenience that the apparatus is adapted for use in connection with the registering and indicating of fares of vehicles.

In the apparatus, there are two systems or sets of spring driven motor mechanisms and wheels. The primary mechanism, which is actuated by hand generally effects and controls the operation of the apparatus; and the second, which is controlled by the first, operates the indicator mechanism. The whole mechanism is disposed within a case 1, which is inclosed in front by a cover 2, having an aperture 3 in it, through which the numerals or markings on the indicator part are visible. The operating parts or mechanisms are carried in a frame generally designated 4.

5 is the primary motor mechanism spring, which is adapted to be wound up in the usual way of a clock spring; and the power of this spring is transmitted by a train of suitable wheels—of which the wheel 6 is the primary wheel—to a pinion 7; the whole gear being regulated and controlled by an escapement mechanism of any suitable kind, a part of which is designated 8, by which the driving mechanism is made to keep time.

The secondary motor spring is designated 10, and is mounted on the opposite side of the frame 4 to the spring 5, 11 being its primary driving wheel; and through a suitable toothed gearing, this spring imparts motion to a pinion 12, mounted on a swinging frame 13, the pivoted spindle 14 of which serves to transmit motion from the train of wheels, through the spur pinions 15 carried on the frame 13 to the pinion 12, which is connected with the last of said spur wheels 15. And this pinion 12 is adapted to be put into and out of gear with the indicating dial 17, which is mounted on a central arbor 18.

The actuating lever by which the apparatus is stopped and started, is designated 20, and is mounted on a hinge 19, having at its lower end a pawl 21 which is adapted to engage with a ratchet wheel 22. Primarily by means of this lever and ratchet wheel, the mechanism is started, actuated, or set, and all the mechanism is governed by it. This ratchet wheel has upon it five projecting pins 23; and upon its spindle 24 there is also mounted another wheel 25, with five projections on it, and which revolves with this wheel 22. The projecting pins 23 operate in connection with a trigger bar 26, fixed upon a swinging frame 27, pivoted at 28, to the main frame; and this frame carries a spur wheel 30, and a disk 31, with projecting pins 32 upon it, both being mounted on the spindle 33, and revolving together; and a spring 29 presses on the projecting pins 32, and normally presses the frame 27, and the toothed wheel 30 toward the driven pinion 7 of the primary motor gearing; and when the apparatus is in action, this wheel 30 will be in gear with the pinion 7, and will be rotated by it.

The movement of the frame 27 inward so as to put the wheel 30 in gear with the wheel 7 is effected when the controlling and actuating lever 20 is operated; that is, when this lever is moved in the direction of the arrow, the pawl 21 will rotate the ratchet wheel 22 a certain amount, and so one of the pins 23 which was bearing on the end of the trigger 26 in the position shown in Fig. 1, (in which the frame 27 is in its outer position, and the wheel 30 is disengaged from the pinion 7), will have moved away from the trigger, and allowed it to be pressed down by the spring 29 into the space between two of the pins 23, and so put the wheel 30 into gear with the pinion 7. When so in gear it rotates, and with it the pin disk 31 rotates. At the same moment as the release of the trigger 26, one end of a bell crank lever 35 which was resting on one of the projections of the projection wheel 25, will be allowed to fall into the space between two of said projections, owing to the projection moving away from the end of this lever in which action, the other end of the bell crank lever 35 which operates in connection with the swinging frame 13, will move away from such frame, and allow it to be pressed by a suitable spring toward the indicating wheel or disk 17, so as to throw the pinion 12 into gear with the teeth of this disk wheel, so that when this pinion 12 is operated by power from the spring 10, the disk wheel 17 will be rotated.

When it is desired to stop the apparatus, the lever 20 is again actuated, and the pawl 21 presses the ratchet wheel 22 another partial revolution, and brings another pin 23 into engagement with the trigger 26, and another projection on the wheel 25 into action with the lever 35. This presses the trigger 26 and the frame 27 outward, so as to throw the toothed wheel 30 out of gear with the driving pinion 7, and also through the bell crank lever 35, to throw the pinion 12 out of gear with the disk 17; whereupon the mechanisms operated by the primary spring motor will be inoperative, the clockwork driven by this mechanism, that is, the time-keeping portion of the apparatus alone being kept in continuous work by the spring 5.

When the apparatus has been started and in action for a certain length of time, which may be say 7½ minutes, or other period, as may be determined upon, the mechanism driven by the spring motor 10 will come into action, it being normally kept out of action by a stop mechanism governed from the wheel 31 and pins 32 thereon. That is to say, after the frame 27 has been thrown into gear by the actuation of the lever 20, and when this period of time has passed, one of the pins 32 will engage with a hooked device 36 mounted on a hinge 37, and connected with a lever 38 having a release and stop device 39 on its end, operating in connection with the second set of mechanism; and the hooked lever 36 will be so acted upon as to be pressed upward, and will thereby through the lever 38 move up the stop 39, which operates in connection with two pins 40 on a wheel 41 of the train of wheels driven by the second motor spring 10.

The stop device 39 is so formed that when moved a slight distance up, a pin 40 will press it up farther, and then will pass it, and so this wheel 41 will revolve only when the other pin 40 comes in contact with the upper part of the device 39; and this device while the wheel 41 was revolving half a revolution, will have been itself pulled down by one of the pins 32 of the disk 31 pressing on the gapped end of a freely suspended hook weight 42, suspended on the end of the lever 36. So the mechanism driven by the spring 10 is again stopped. During the half revolution however of the wheel 41, the pinion 12, which will be engaged with the numeral indicating disk 17, will have been rotated, and revolved such disk a partial revolution, corresponding with the divisions of the indicating or fare representing numerals upon it, and then it will have been stopped by one of the pins 40 coming in contact with the stop head 39; and so long as the apparatus is in this condition, it will go on working, and every division of time, the fare indicating disk will be moved one division.

The stopping of the apparatus at the end of the time required by the fare is effected by actuating the lever 20 as above described, and when this is done, and the pinion 12 thrown out of gear with the disk 17, this gear will be brought back to zero or starting position; and this is effected by the following means. On or connected with the disk wheel 17, there is fixed a heart-shaped cam 44, which is operated upon by a roller 45 fixed on a pivoted arm 46, and normally pressed toward the heart cam by a spring 47; and when the disk 17 is in the zero position, the edge of the roller 45 will lie in a recess in the inner end of the cam 44, as shown in Fig. 1, and so will hold it in this zero position. When the disk 17, and with it the cam 44, is rotated, the lever 46 will, through the roller 45, be pressed away; and when, on the other hand, the disk 17 is freed, by the pinion 12 being moved out of gear with it, the roller 45 acting upon the periphery of the cam 44 through the tension of the spring 47, will force this disk 17 back to the zero position.

Normally when the apparatus is set, that is, actuated, for action, the lever 46 will be pressed away from the cam 44 by one of the projecting pins 23 coming in contact with its edge during the setting action, and it will remain in this position until it is again actuated in the stopping action when the lever 46 is free, and the roller moves in onto the cam. By this actuation, the friction due to the pressure of the spring 47 is removed from the actuation, so that the power of the spring 10 and gearing is not interfered with.

What is claimed is:—

1. In a fare indicating and registering mechanism, a clockwork mechanism having a part of its gearing carried in a swinging frame, a spring motor mechanism having a part of its gearing carried in a pivotally mounted frame, a fare indicator, an operating lever, a rotatable device having a plurality of series of projections capable of being operated by the lever, and of actuating the swinging and pivotally mounted frames; means interposed between the said frames and the rotatable device whereby motion is imparted to the former from the latter; means actuated by the clockwork mechanism, for permitting the spring motor mechanism to operate intermittently; and means for returning the indicator to the zero position.

2. In a fare indicating and registering mechanism, a clockwork mechanism having a part of its gearing carried in a swinging frame, a spring motor mechanism having a part of its gearing carried in a pivotally mounted frame, a fare indicator, an operating lever having a pawl at its lower end, a rotatable device having a ratchet wheel capable of being engaged by the pawl on the lever, and a series of projections on one of its side faces; means interposed between the said device and the frames for causing motion to be imparted to the latter when the former is rotated by the lever and ratchet wheel; mechanism which controls the spring motor mechanism; and means for returning the indicator to the zero position.

3. In a fare indicating and registering mechanism, a clockwork mechanism, a swinging frame having a projecting tongue and carrying gearing and a pin wheel, and capable of being permitted to engage, and of being put out of engagement, with the clockwork mechanism; a spring for controlling the movement of the swinging frame; a spring motor mechanism, a pivotally mounted frame carrying gearing capable of being permitted to engage, and of being put out of engagement, with the motor mechanism; a rockable lever engaging with the pivotally mounted frame; a hand operated lever having a spring pawl at one end; a rotatable device having a ratchet wheel capable of being engaged by the said pawl, and having projecting pins and teeth on one side face, engaging with the tongue of the clockwork mechanism, and the said rockable lever so as to enable the said frames to be actuated by the pins of the rotative device; a detent release device which controls the spring motor mechanism and is capable of being actuated by the pin wheel of the clockwork mechanism; and a fare indicator capable of being engaged by the gearing carried by the pivotally mounted frame.

In testimony whereof I have signed my name to this specification in the presence of two subscribing witnesses.

HENRY EUSTACE SAYER.

Witnesses:
   SOMERVILLE GOODALL,
   DONALDSON PETER COULTER.